(No Model.)
G. ABRAMS.
ROTARY STEAM ENGINE.
No. 437,076. Patented Sept. 23, 1890.
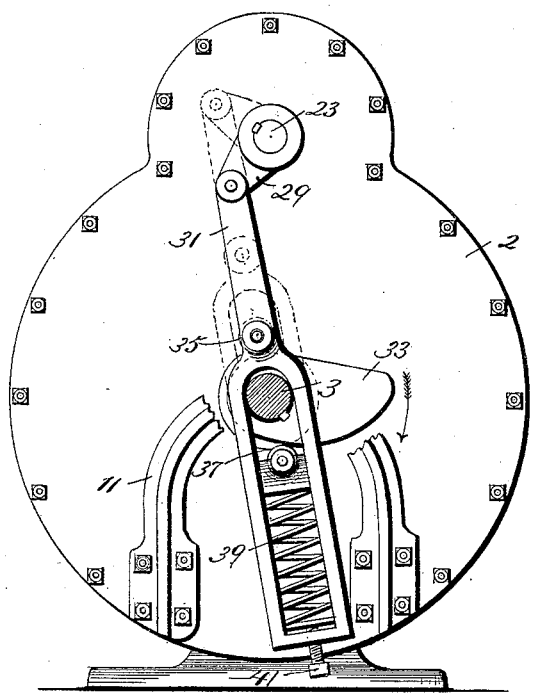
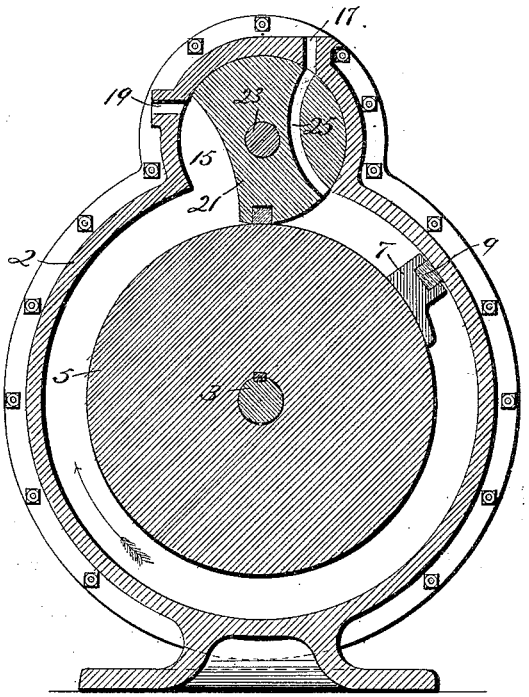
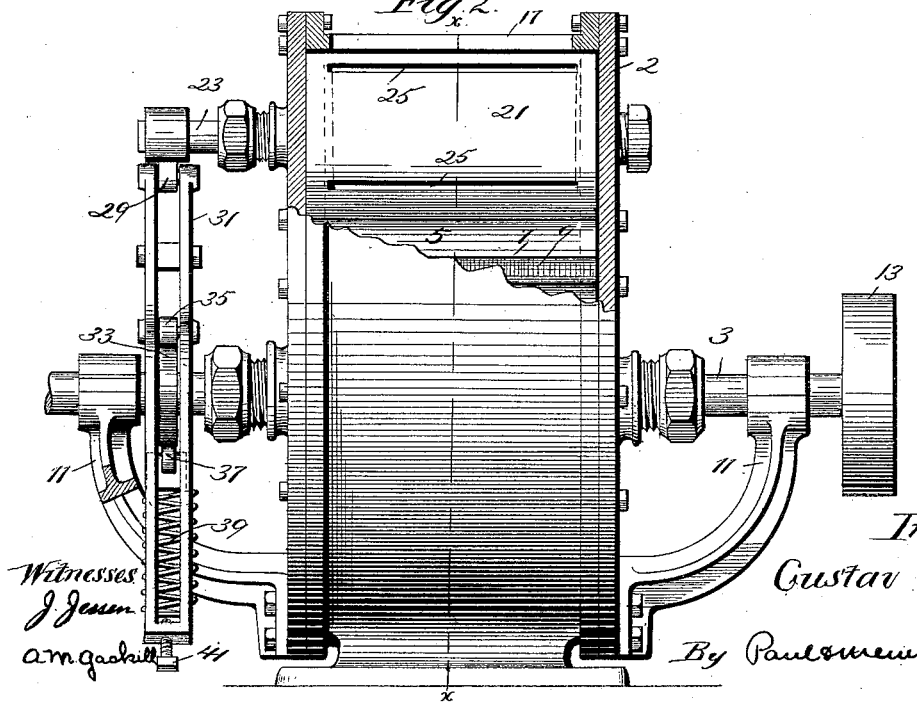
Witnesses
J. Jensen
A. M. Gaskill
Inventor
Gustav Abrams
By Paul Guerrin att'ys

UNITED STATES PATENT OFFICE.

GUSTAV ABRAMS, OF HOPKINS, MINNESOTA, ASSIGNOR OF TWO-THIRDS TO CHRISTIAN TOSTENSON AND ANDREW GUSTAV BERGSTROM, BOTH OF SAME PLACE.

ROTARY STEAM-ENGINE.

SPECIFICATION forming part of Letters Patent No. 437,076, dated September 23, 1890.

Application filed October 14, 1889. Serial No. 326,936. (No model.)

*To all whom it may concern:*

Be it known that I, GUSTAV ABRAMS, of Hopkins, county of Hennepin, and State of Minnesota, have invented certain new Improvements in Rotary Steam-Engines, of which the following is a specification.

The object of this invention is to provide an improved rotary engine which shall be simple in construction, in which the steam may be applied directly to the revolving piston and may be cut off at any desired point in the stroke of the piston; and the invention consists, generally, in the construction and combination hereinafter described, and particularly pointed out in the claim.

In the accompanying drawings, forming a part of this specification, Figure 1 is a side elevation of my improved engine. Fig. 2 is a front elevation of the same, the upper portion being in section for the purpose of showing the arrangement of the valve. Fig. 3 is a vertical section on line $x$ $x$ of Fig. 2.

In the drawings, 2 represents the engine-cylinder, which may be of any suitable construction. Mounted in suitable bearings in this cylinder is a shaft 3, to which is secured a suitable piston 5. An annular space is left within the cylinder between the outer wall of the piston and the inner wall of the cylinder.
An abutment 7, provided with a packing 9, is secured to the outer surface of the piston and extends across the space between this surface and the inner wall of the cylinder. Suitable arms 11 are preferably secured to the outer wall of the cylinder and form bearings for the shaft 3 at points considerably distant from the wall of the cylinder. The shaft 3 may be provided with a suitable pulley 13, from which a belt may be run for the purpose of applying power to any desired mechanism. A cylindrical valve-chamber 15 is arranged adjacent to the circumferential wall of the cylinder 2. The valve-chamber 15 opens into the cylinder, as shown in Fig. 3, and the valve-chamber is provided with a suitable steam-port 17 and with an exhaust-port 19. A rotary valve 21, of cylindrical form, secured upon a suitable shaft 23, is mounted in the valve-chamber 15. This valve is cut away at one side on an arc which corresponds to the arc of the circumference of the cylinder 2, so that when said valve is in position with its cut-away portion toward the center of the cylinder the wall of the valve forms a continuation of the wall of the cylinder. The valve 21 is provided with a steam-port 25 extending through it, and arranged so that when one end of said steam-port is in communication with the steam-port 17 the other end will communicate with the interior of the cylinder, as shown in Fig. 3, and the packing 27 will then be against the circumferential surface of the piston 5 and the cut-away portion of the valve will at such time permit free communication between the cylinder and the exhaust-port 19. The valve-shaft 23 is provided with a suitable crank 29, to which is secured a rod 31. A cam 33 is secured upon the shaft 3 and engages the rod 31. I prefer to provide the rod 31 with a fixed roller 35 and with a roller 37, mounted in slots in said rod 31 and arranged to be pressed toward the cam 33 by a suitable spring 39. A set-screw 41 is provided for regulating the tension of the spring. By changing the position of the cam 33 upon the shaft 3 the valve may be made to cut off the steam at any point in the stroke of the piston without reference to the position of the abutment on the piston, so that the steam may be cut off at any desired point and the further movement of the piston be obtained by the expansion of the steam. By this means the desired movements are given to the valve 21, and the point at which the steam will be cut off may be determined. By arranging one of the bearing-rolls in yielding bearings the cam 33 may be at all times engaged by both of the rolls, thereby preventing any jarring of the rod.

The operation of the engine will be readily understood. The parts being in the position shown in Fig. 3 the steam enters through the port 17 and the port 25 into the cylinder in the rear of the abutment 7, the space on the other side of the abutment being now open to the exhaust. The piston is caused to rotate, and when it has reached the desired point in its movement the cam 33 turns the valve 21, carrying the end of the port 25 away from the port 17, and thereby closing the steam-port, while the exhaust-port remains open and the surface of the cylindrical valve also remains in contact with the surface of the piston. The steam will now be cut off and the further movement of the piston will be caused by the expansion of the steam in the cylinder. As the abutment 7 approaches the valve-chamber the valve will be turned so that its cut-away portion will form a continuation of the circumferential wall of the cylinder. As soon as the abutment has passed the valve the valve will be again turned so as to open the exhaust and also establish communication between the steam-port 17 and the cylinder.

I claim as my invention—

The combination, with the cylinder and the piston 5, provided with the abutment 7, of the cylindrical valve-chamber connected with said cylinder and provided with the steam-port and exhaust-port, the cylindrical valve 21, arranged in said valve-chamber and provided with the steam-port 25, extending through said valve, and with a cut-away portion adapted to connect said exhaust-port with said cylinder and to coincide with the walls of the cylinder when turned into position to close both the steam and exhaust ports, the eccentric 33 on the piston-shaft, and means connecting said eccentric with the valve, whereby the valve may be turned to cut off the steam at any point in the stroke without moving away from the surface of the piston and may be turned to coincide with the surface of the cylinder to permit the abutment on the piston to pass, substantially as described.

In testimony whereof I have hereunto set my hand this 2d day of October, 1889.

GUSTAV ABRAMS.

In presence of—
A. C. PAUL,
A. M. GASKILL.